United States Patent Office 3,546,563
Patented Dec. 8, 1970

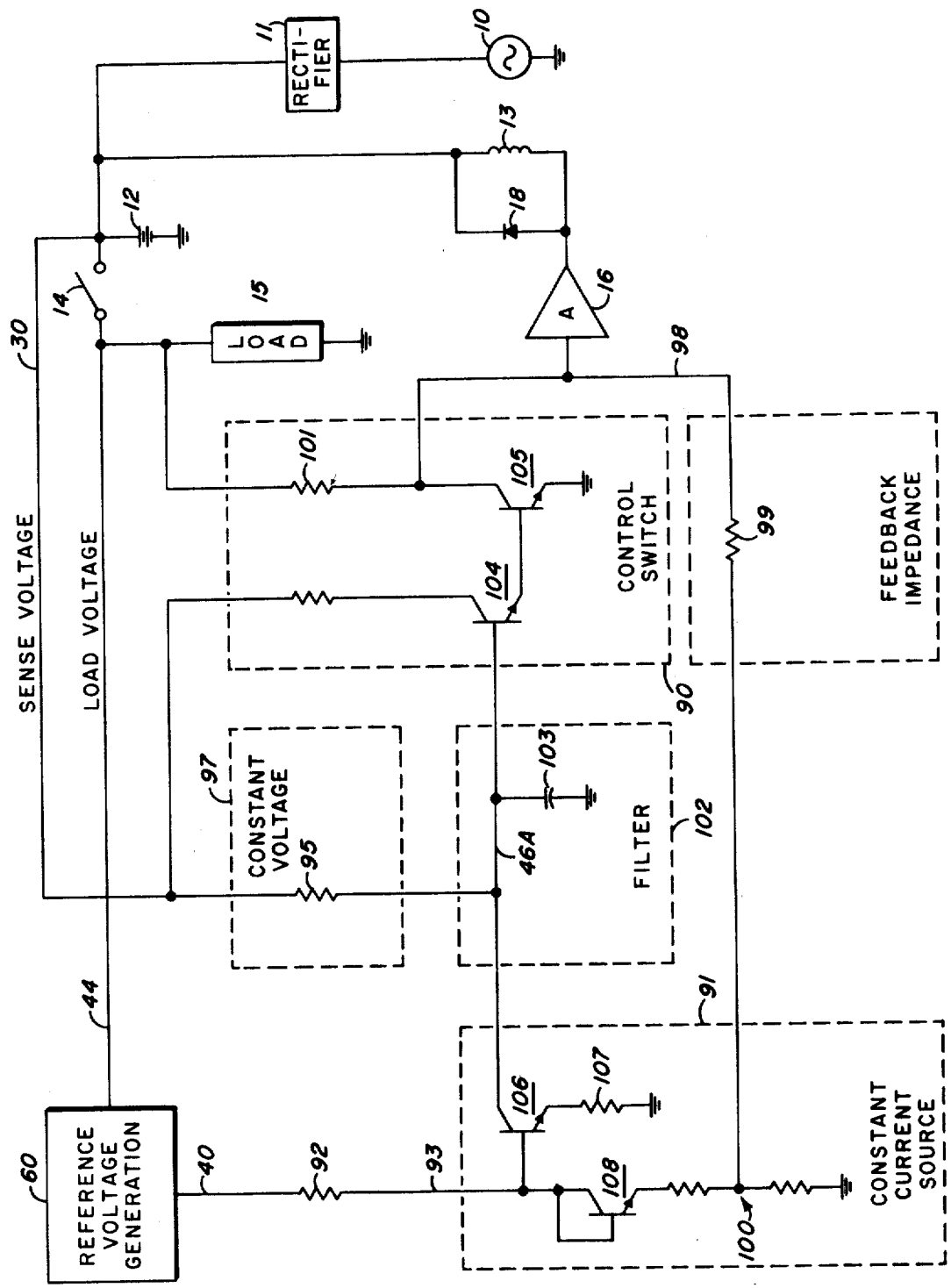

1

3,546,563
ALTERNATOR VOLTAGE REGULATION UTILIZING A CONSTANT CURRENT SOURCE
James E. Thompson, Scottsdale, Ariz., assignor to Motorola, Inc., Franklin Park, Ill., a corporation of Illinois
Filed Mar. 4, 1968, Ser. No. 710,050
Int. Cl. H02p 9/30; H02j 1/04
U.S. Cl. 322—28                                5 Claims

ABSTRACT OF THE DISCLOSURE

A vehicular alternator control circuit having a temperature responsive reference voltage generator establishing a temperature control reference voltage compared with a battery or alternator generated voltage. A constant current source receives the reference voltage as well as the voltage being generated. A constant current and therefore constant voltage is developed across a resistor. As the alternator voltage changes, the change is transmitted through the resistor to a control loop which reacts to alter the field current of the alternator to adjust the generator voltage in accordance with the reference voltage. The regulator is of the on-off type.

BACKGROUND OF THE INVENTION

This invention relates to the control of voltage generation and particularly to control of that voltage generation provided by motor driven alternator.

It has been desired for several years to provide a completely solid-state control circuit for a vehicular motor driven alternator. Problems involved in the provision of the solid-state control circuiting include the power dissipation capacity of the controlling element and the stability of the control circuit. Electronic or solid-state devices are much faster than the alternator response and therefore, the design has to accommodate the difference in responsiveness. It is also desired that the entire control circuit be integrated on one monolithic silicon chip. To this end, the number of components should be minimized, especially the capacitive elements. In some voltage regulator systems, such as those used in automotive electrical systems, the generated voltage varies in accordance with temperature changes. Below zero degrees centigrade, for example, the voltage generated by alternator for charging a battery should be maximum since at the colder temperature the battery requires a higher voltage to accept a given charge level. At higher temperatures, for added battery life, it is desired to reduce the voltage generated such that the battery will not overcharge.

SUMMARY OF THE INVENTION

It is an object of this invention to provide an improved alternator control circuit which facilitates integration on a single monolithic silicon chip.

It is another object of this invention to provide an integrated circuit type alternator control circuit which accurately controls the generated voltage.

A feature of the present invention is the utilization of constant source receiving a reference voltage to be compared with a voltage being generated. Another feature is the provision of a constant voltage across a fixed resistor to transfer changing alternator voltage to a control loop which alters the field current of the alternator to adjust the voltage being generated. The change generated voltage transfers to the loop which is delayed by a capacitor and then fed back to the constant current source to dynamically change the effective reference voltage being supplied to the loop. The capacitor serves as a timing response control element in the control loop as well as a

2 filter for the voltage being generated. Another feature of the present invention is the provision of a regenerative control loop and a voltage regulator which is actuated jointly by the reference voltage and the generated voltage to control the field current in an alternator.

THE DRAWING

The single drawing illustrates an embodiment of the present invention.

DESCRIPTION OF THE ILLUSTRATIVE EMBODIMENT

Referring now to the drawing, alternator 10 supplies AC to rectifier 11 which in turn supplies DC current to charge battery 12. The alternator or field coil 13, usually the rotor, receives current from battery 12 as controlled by amplifier 16, as will be described. Ignition switch 14 of usual design selectively connects battery 12 to load 15, which may be the usual automotive load. Load voltage line 44 connects switch 14 to reference voltage generation circuit 60. Circuit 60 may be the circuit illustrated in my copending patent application Ser. No. 666,130 filed Sept. 7, 1967. With respect to that copending patent application, the output voltage as described therein is supplied to line 40 of the present application, while the load voltage line 44 corresponds to the positive terminal of the battery (input) shown in that copending application. Sense voltage line 30 connects the positive terminal of battery 12 to control switch 90 and to sense current resistor circuit 97.

The illustrated control circuit includes a regenerative control loop including constant current source 91, filter 102, control switch 90 and feedback impedance 99. The control loop is jointly responsive to the reference voltage on the line 40 and to the sense voltage on line 30 to control the current amplitude in field coil 13 via amplifier 16 for maintaining the rectified DC voltage of rectifier 11 at a predetermined amplitude. The control loop is responsive to the voltage to switch amplifiers 16 on and off for causing an on-off control of field coil 13 current. For providing a continuing current through coil 13, flywheel diode 18 is added. When amplifier 16 is conducting heavily, current flows from battery 12 through coil 13 and amplifier 16 to ground reference potential. When amplifier 16 is switched to a non-conductive state by control switch 90, current continues to flow through coil 13 via flywheel diode 18. Diode 18 also acts to suppress transient voltages induced in field coil 13 by the above-described switching action. As the generated or sense voltage in line 30 is increased to a predetermined amplitude, amplifier 16 is switched off. Sense voltage on line 30 is then permitted to decay to a lower predetermined amplitude at which time amplifier 16 is switched to a conductive state, as will be fully described.

The action of the illustrated embodiment will now be described. Because constant current source 91 draws current through resistor 95, there is provided a constant voltage drop thereacross. The amount of voltage drop is determined in part by the reference voltage magnitude supplied over line 40. As the sense voltage on line 30 changes (for example, decreases), the decrease is supplied to line 46A because of the constant voltage drop across resistor 95. Capacitor 103 tends to discharge to a lower voltage through transistor 106 and resistor 107 of constant current source 91. As the voltage amplitude on line 46A decreases, the conductivity of transistor 104 in the control switch 90 decreases. This decrease reduces the base drive to transistor 105 toward current cutoff. As a result, there is an increase of voltage on line 98. This increase in voltage amplitude is supplied through feedback impedance 99 to junction 100 of constant current source 91. This increased voltage amplitude is reflected through diode-connected transistor 108 to the base electrode of transistor 106. Dynamically, this feedback makes a small decrease on line 46a appear much larger to transistor 106 than it actually is. As a result there is an increased change throughout the loop until output amplifier 16 is forced to current conduction in a relatively short time. This short time is determined by the time constant supplied by capacitor 103 in conjunction with resistor 95.

As amplifier 16 begins conducting additional current flows through field coils 13, increasing the voltage supplied by alternator 10. As the alternator 10 increases its voltage amplitude the sense voltage on line 30 increases. This increase is supplied through resistor 95 to line 46a, it being remembered that there is a constant voltage drop across resistor 95 by the action of constant current source 91. This increase in voltage amplitude is supplied to the base electrode of transistor 104 which increases its conductivity and therefore increases the current conductivity of transistor 105. The increased conductivity of transistor 105 causes increased current flow from battery 12, through switch 14 and collector resistor 101, causing the voltage on line 98 to decrease. Such decreased voltage is then supplied through feedback impedance 99 through junction 100 of constant current source 91. Such decrease in voltage amplitude in the emitter circuit of diode-connected transistor 108 makes transistor 106 see an apparent larger increase in voltage than actually occurs. As a result transistor 106 becomes less current conductive to quickly force the voltage on line 46a to increasing magnitude for switching amplifier 16 to current nonconduction. Current is then no longer drawn through amplifier 16 but continues to flow through coil 13 through the action of flywheel diode 18.

The above-described cycle of turning amplifier 16 on and off is repeated at a rate determined by charge and discharge rate of battery and RC time constant (resistance of resistor 95 × the capacitance of capacitor 103) for maintaining the rectified voltage supplied by rectifier 11 at a predetermined amplitude.

Temperature compensation of the generated voltage may be provided by reference voltage generation circuit 60 by supplying a reference voltage over line 40 which is determined by the temperature of the circuit. As the voltage in line 40 is changed by the temperature or another phenomenon, the base drive to transistor 106 correspondingly changes to effect the constant current flowing through resistor 95. This changes the switching point of the control circuit such that the generator voltage will follow the reference voltage. As the reference voltage on line 40 decreases, the conductivity of transistor 106 in constant current source 91 is correspondingly decreased providing a relatively higher voltage on line 46A.

I claim:

1. A temperature responsive alternator control system for maintaining alternator voltage at a predetermined amplitude and having an output amplifier for being connected to the field coil of an alternator, an input means for receiving DC voltage from the alternator which voltage having small amplitude variations thereon, the improvement including in combination, sensing impedance means receiving the DC voltage and supplying a sense current amplitude indicative of the alternator voltage amplitude and having constant voltage drop thereacross, control switching means responsive to an actuating signal to selectively alter its current conductive state between conduction and nonconduction for supplying a control signal to the output amplifier indicative of such conductive states and for switching the amplifier between current conduction and nonconduction for controlling the current through the field coil, feedback means receiving said control signal and supplying a feedback signal indicative of whether said conductivity state alternation is increasing or decreasing, reference voltage generation means supplying a reference voltage, impedance means receiving the reference voltage means and supplying a reference current, constant current source means having a first input receiving said reference current, a second input receiving said supplied current responsive to the reference current to control the amplitude of the sense current at a constant amplitude such that variations of the input DC voltage are transferred through said sensing impedance means and supplied to said control switching means as an actuating signal and having a feedback input receiving said actuating signal and responsive thereto to dynamically adjust said actuating signal to indicate a greater rate of change in said supplied DC voltage than is actually occurring wherever an increasing or decreasing magnitude is encountered.

2. The system of claim 1 wherein said constant current source comprises a transistor with its collector connected to said sense current resistor and a capacitor extending from said collector to a reference potential.

3. In a DC voltage regulator having a sense terminal connectable to one electrode of a battery to be charged, and an output transistor stage adapted to be coupled to an alternator field coil for controlling the current therethrough, the improvement comprising in combination:

(a) a constant current source connected between a reference voltage and a point of reference potential and biased to conduct a substantially constant current under quiescent conditions, (b) sensing impedance means connected between said sense terminal and said constant current source and further connected to said output transistor stage for developing thereacross a substantially constant voltage and thereby establishing a quiescent voltage level at the input of said output transistor stage, and (c) feedback means connected between the output of said output transistor stage and said constant current source for coupling a dynamic voltage change to said constant current source which in turn produces a larger dynamic voltage change at the input of said output transistor stage, whereby the conduction in said output transistor stage is rapidly increased or decreased in response to variations in voltage at said sense terminal, said conduction in said output transistor stage rapidly changing the conduction level in said field coil of said alternator to in turn cause a rapid regulation of the DC voltage at said sense terminal.

4. The voltage regulator defined in claim 3 wherein (a) said constant current source includes at least one transistor therein having input, output control electrodes, said input electrode connected to receive a constant reference voltage for establishing the level of conduction in said one transistor, and (b) said feedback means DC coupled to said input electrode of said one transistor in said constant current source for applying a positive feedback signal to the input electrode of said one transistor, thereby causing a larger voltage change to appear at the output electrode of said one transistor than originally occurred at said sense terminal, whereby said voltage change at said sense terminal is rapidly magnified by positive feedback in a control loop including said output transistor stage, said feedback means and said constant current source to rapidly alter the level of current conduction in said field coil and rapidly regulate the DC voltage at said sense terminal.

5. The regulator as defined in claim 4 which further includes:

(a) a filter capacitor connected between the input of said output transistor stage and a point of reference potential, said filter capacitor charging toward the voltage on said sense terminal and establishing the time constant of said control loop, (b) said constant current source including a resistor-diode bias string connected between said input electrode of said one transistor and a point of reference potential for establishing a quiescent DC operating level at the input electrode of said one transistor, (c) said feedback means including a feedback resistor connected between the output of said output transistor stage and a selected intermediate point on said resistor-diode bias string for coupling a voltage transition to said input electrode of said one transistor, said voltage transition being in the same direction as the voltage change at the output of said output transistor stage and in the opposite direction to the voltage change across said filter capacitor, and (d) said output transistor stage including a pair of Darlington-connected transistors between an output amplifier and said filter capacitor for controlling the input voltage of said output amplifier and in turn controlling the level of current flowing in said field coil of said alternator.

References Cited

UNITED STATES PATENTS

| 3,069,617 | 12/1962 | Mohler | 323—22TCI |
| 3,209,236 | 9/1965 | Bridgeman | 322—28 |
| 3,323,038 | 5/1967 | Greenberg et al. | 323—22(T) |

ORIS RADER, Primary Examiner

H. HUBERFELD, Assistant Examiner

U.S. Cl. X.R.

322—33, 73; 323—1, 19